United States Patent

Schmid

[15] 3,668,893
[45] June 13, 1972

[54] SYNCHRONOUS UNIVERSAL COUPLING

[72] Inventor: Leopold F. Schmid, Leharstrasse 8, D 7000 Stuttgart, 1, Germany

[22] Filed: Feb. 22, 1971

[21] Appl. No.: 117,367

[30] Foreign Application Priority Data

Aug. 12, 1970   Germany ............... P 20 39 965.9

[52] U.S. Cl. ............................................................ 64/21
[51] Int. Cl. ............................................................ F16d 3/30
[58] Field of Search ............................................ 64/21, 17

[56] References Cited

UNITED STATES PATENTS

| 2,839,905 | 6/1958 | Trbojevich | 64/21 |
| 3,514,973 | 6/1970 | Kozerski | 64/17 |
| 3,520,152 | 7/1970 | Schmid | 64/21 |

Primary Examiner—Edward G. Favors
Attorney—Waters, Roditi, Schwartz & Nissen

[57] ABSTRACT

A synchronous universal coupling comprises inner and outer pivotal parts which are couples by a coupling member which transmits torque between the parts while enabling the parts to vary their relative angular positions with full synchronization. The coupling member is in the form of a cross with four arms at right angles to one another, two of the arms having a common bore receiving the inner pivotal part, the other arms having a common bore receiving the inner pivotal part, the other arms having aligned, spaced bores on opposite sides of the inner part receiving balls rollably engaged with respective surfaces of the inner and outer parts. The inner part may be cylindrical to fit the shape of the common bore, or alternatively the inner part may comprise a spherical portion received in the coupling member with cylindrical journals rotatable in the ends of the common bore.

5 Claims, 10 Drawing Figures

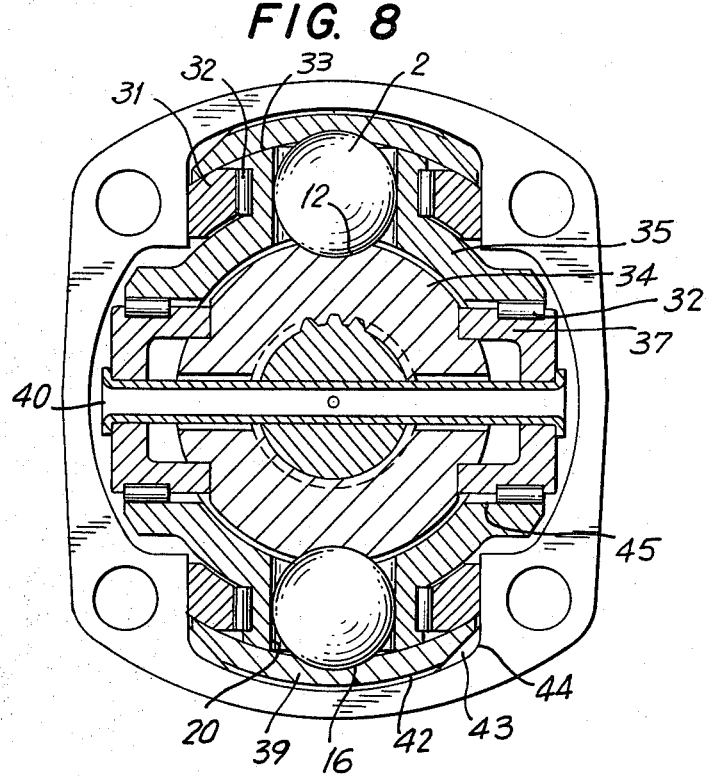
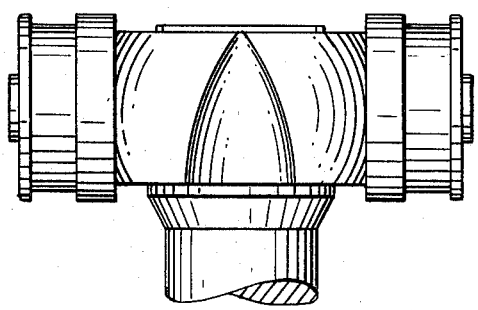
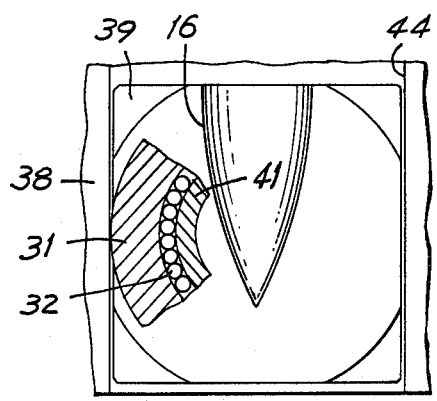

SYNCHRONOUS UNIVERSAL COUPLING

BRIEF SUMMARY OF THE INVENTION

The invention relates to universal couplings, and particularly to universal couplings in which the pivotal parts thereof have fully synchronized movements during their relative pivotal movements.

It is known to effect transmission of torque from one pivotal part to the other using a coupling member hinge connected to one pivotal part and engaged with the other part by control members engaged in two axial grooves in the other part.

Such a synchronous universal coupling is disclosed in U.S. Pat. No. 2,432,395. In this synchronous universal coupling, the two pivotal parts are constructed as forks and the coupling member for transmission of the torque from one pivotal part to the other has four arms in the form of trunnions intersecting each other at right angles. The movements of the coupling member permit synchronized relative movements of the two pivotal parts through control assemblies housed in axial grooves in one pivotal part. The control assemblies are diametrically opposed and each comprises a pin carrying a spring loaded ball movable along a curved surface of a plate rigidly secured to the other pivotal part.

The aforementioned construction has the disadvantages of considerable mass, great weight, high manufacturing costs and substantial sealing difficulties. Further drawbacks exist in its comparatively small turning angle and in the fact that it is impossible to obtain complete synchronism at all turning angles.

An object of the present invention is to provide a synchronous universal coupling of this type but which is free from the enumerated disadvantages.

This object is achieved according to the invention by seating the control members in bores provided in the coupling member. A feature of the invention is that the pivotal part rigidly connected in rotation to the coupling member, is located inside the coupling member. Consequently, the pivotal member can be constructed as a jointed axle of cylindrical shape with a uniform outside diameter seated in a through bore in the coupling member. This pivotal part can also be made spherical in shape and provided with two journals which are seated in the bore in the coupling member.

BRIEF DESCRIPTION OF THE DRAWING

FIG. 8 is a transverse cross section through the synchronous universal coupling according to FIG. 6;

FIG. 9 is a top plan view of the inner pivotal part; and

FIG. 10 is a plan view partially in section of a portion of the universal coupling of FIG. 8.

DETAILED DESCRIPTION

The synchronous universal coupling shown FIGS. 1-5 is constructed as a so-called stationary coupling as used for example on the wheel side of the front wheel drive of a motor vehicle, while usually on the axle side a so-called sliding coupling is used, as shown for example in FIGS. 6-10. In other words, in the coupling in FIGS. 1-5, the parts are coupled together for universal movement about a fixed point, whereas in FIGS. 6-10, the parts can additionally undergo relative axial displacement.

Figure 1:
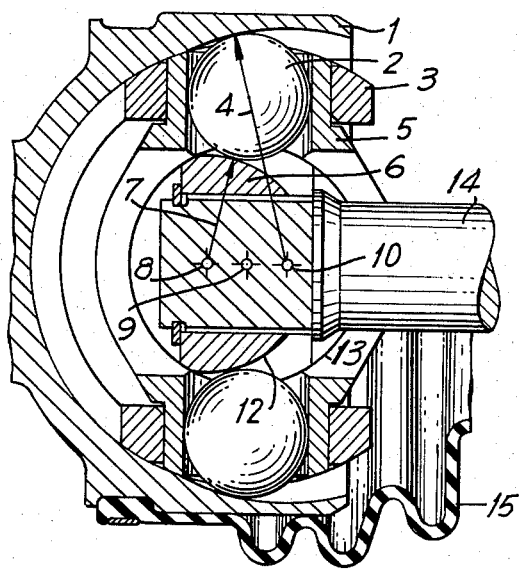
FIG. 1 is a longitudinal section through a synchronous universal coupling in straight position of the pivotal parts.
Figure 2:
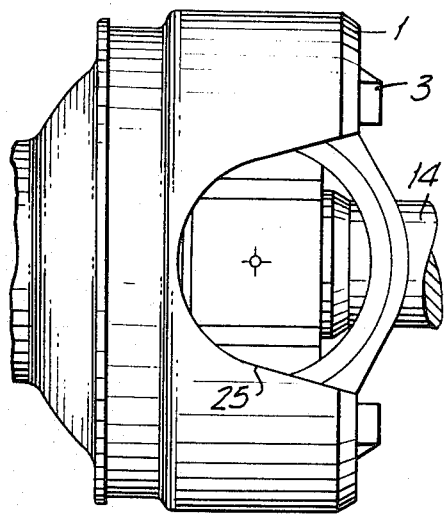
FIG. 2 is an elevational view of the synchronous universal coupling in FIG. 1.
Figure 3:
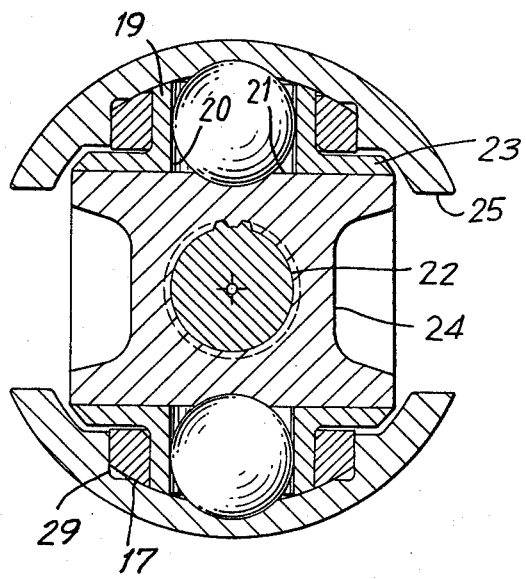
FIG. 3 is a transverse cross section through the synchronous universal coupling according to FIG. 1.
Figure 4:
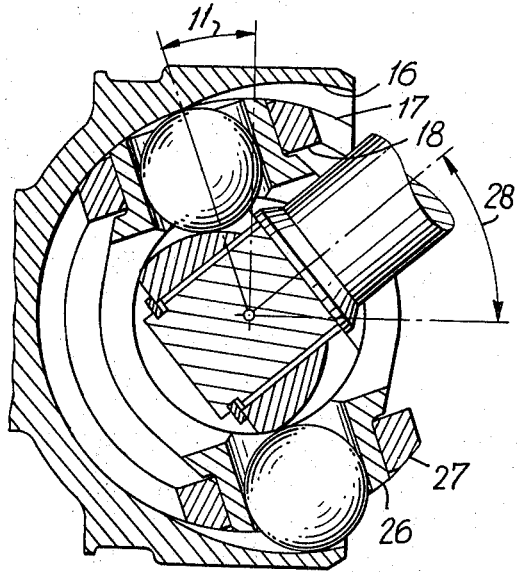
FIG. 4 is a longitudinal section through the synchronous universal coupling according to FIG. 1, but with the pivotal parts in angular position.
Figure 6:
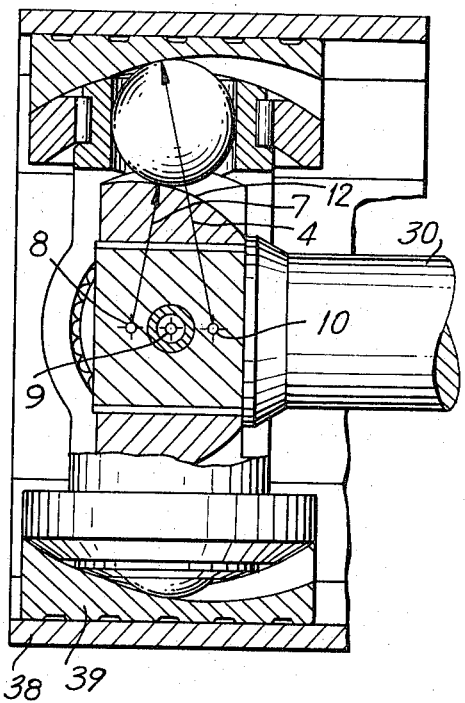
FIG. 6 is a longitudinal section through a modified synchronous universal coupling in straight position of the pivotal parts.
Figure 5:
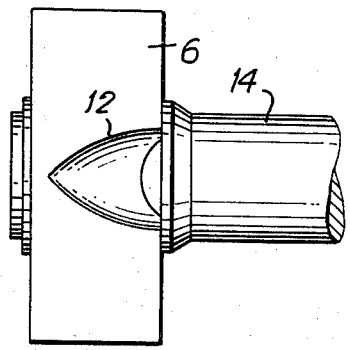
FIG. 5 is a top plan view of the inner pivotal member.
Figure 7:
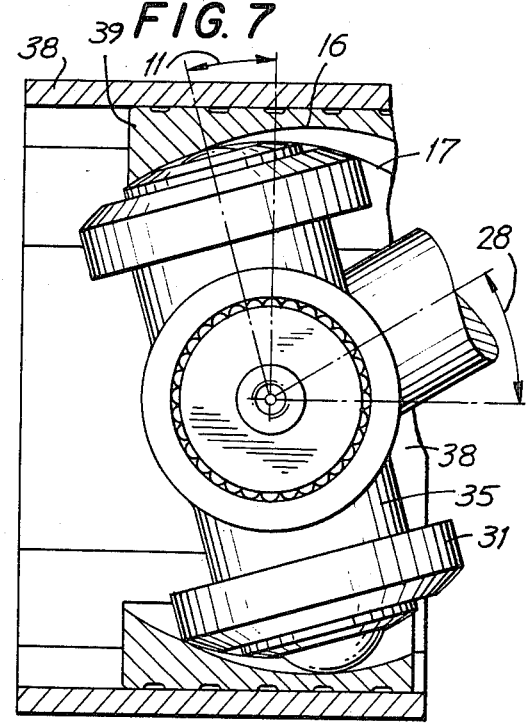
FIG. 7 is an elevation view partially in section through the synchronous universal coupling according to FIG. 6, but with the pivotal parts in angular position.

Referring to FIGS. 1-5, therein is shown an outer pivotal part 1 which in the case of a front wheel drive for a motor vehicle is rigidly connected with a wheel, said outer part 1 being driven by a shaft 14 which is rigidly connected to the inner pivotal part 6 by a spline connection 22. The transmission of torque from the inner part 6 to the outer part 1 is effected through a coupling member 5. The member 5 is in the form of a cross and has four arms crossing at right angles and provided with respective bored holes. The horizontal arms 23 of member 5 are provided with a common bore 13, in which is received the inner pivotal part 6. The part 6 has a uniform outside cylindrical diameter 21 and is rotatable in bore 13 about axis 9 as shown in FIG. 4. The vertically extending arms 19 of member 5 are provided with bores in which are seated control members 2 constructed as balls. The balls 2 are movable on curved control surfaces 12 and 16 respectively in inner and outer pivotal parts 6 and 1, and the balls 2 govern the movements of coupling member 5 effecting the synchronized relative movement of the two pivotal parts 1 and 6. The center 8 of radius 7 to the surface 12 is offset by the same distance from center 9 of the synchronous universal coupling as is the center 10 of radius 4 to the surface 16 whereby the angle of traverse 11 of coupling member 5 is always one-half the angle of traverse 28 of driving shaft 14 and 100 percent synchronism is therefore obtained for all angles of turn. The transmission of the torque from coupling member 5 to the outer pivotal part 1 is effected through rollers 3 which are rotatably mounted on the vertical arms 19, and in grooves 29 formed in the outer pivotal part 1. The outer surface 27 of the rollers 3 is spherical as is the bottom 17 of the grooves 29, in which the coupling member 5 is centered by its spherical surfaces 26. The outer pivotal part 1 is provided with notches 25 to provide access for the finishing operations for grooves 17, 29 and of the curved control surfaces 16 as well as the assembly and disassembly of a split lock washer at the end of shaft 14. A rubber sleeve 15 encloses the coupling and prevents the escape of lubricant filling the same while protecting the coupling against intrusion of foreign substances. An elongate aperture 18 is provided in the coupling member 5 for the passage of shaft 14 to permit relative pivotal movement of the parts. Recesses 24 are provided to decrease the weight of the inner pivotal part 6.

In FIGS. 6-10 the coupling member 35 is also formed as a cross with four arms crossing at right angles and provided with respective bores. The horizontal arms 36 of coupling member 35 are provided with a common through hole 45 which receives two journal pins 37 rigidly connected with a spherical portion of inner pivotal part 34. Rollers 31 are mounted on needle bearings 32 on the vertically extending arms 41 of coupling member 35 and the torque is transmitted via rollers 31 to grooves 44 in the outer pivotal part 38. Sliding parts 39 are also disposed in grooves 44 and parts 39 have spherical inner surfaces on which the coupling member 35 is centered through spherical surfaces 33 thereof. The sliding parts 39 are provided with passageways 42, into which lubricant is forced under centrifugal force. By virtue of the sliding parts 39, the inner and outer pivotal parts can be axially displaced relative to one another. A tubular rivet 40 connects the two journal pins 37 with the spherical portion of inner pivotal part 34 and it also serves to secure the shaft 30 axially.

The advantages obtained by the construction according to this invention consist especially in that it is possible to produce a synchronous universal coupling with only a few, easily manufacturable parts and that it is able to transmit high torque with high efficiency in a small space. Drive tests with motor vehicles, whose front wheels were driven by synchronous universal couplings according to the invention, have shown that a synchronous universal coupling of the size shown in FIGS. 1-5 can be used for a driving motor of 110 metric HP performance.

Synchronous universal couplings according to this invention are small in weight, have a large turning angle and give 100 percent synchronism at all turning angles. They can be easily assembled and disassembled.

What is claimed is:

1. A universal coupling comprising inner and outer pivotal parts, and means joining the pivotal parts for transmitting torque therebetween while enabling the parts to vary their relative angular positions, said means comprising a coupling member in the form of a cross with four arms at right angles to one another, two of said arms having a common bore rotatably receiving the inner pivotal part, the other arms having aligned spaced bores on opposite sides of said inner part, and control means in said spaced bores in said other arms and engaging said pivotal parts to synchronize relative pivotal movement of said parts, said control means comprising a ball in each spaced bore rollably engaged with respective surfaces of said parts.

2. A coupling as claimed in claim 1 wherein said inner part is located wholly within said coupling member, and a shaft is connected to said inner part and extends externally of said coupling member, said coupling member being provided with an elongate aperture permitting passage of said shaft therethrough and relative pivotal movement therebetween.

3. A coupling as claimed in claim 1 wherein said inner part has a cylindrical outer surface, and said common bore has a uniform diameter through said coupling member.

4. A coupling as claimed in claim 1 wherein said inner part comprises a spherical portion located within said coupling member and two opposed journals pivotably mounted in said common bore.

5. A coupling as claimed in claim 1 wherein said outer pivotal part has a groove receiving each said ball, and comprises a part axially slidable in each groove, said balls being rollable on respective of the latter parts.

* * * * *